Patented Sept. 9, 1952

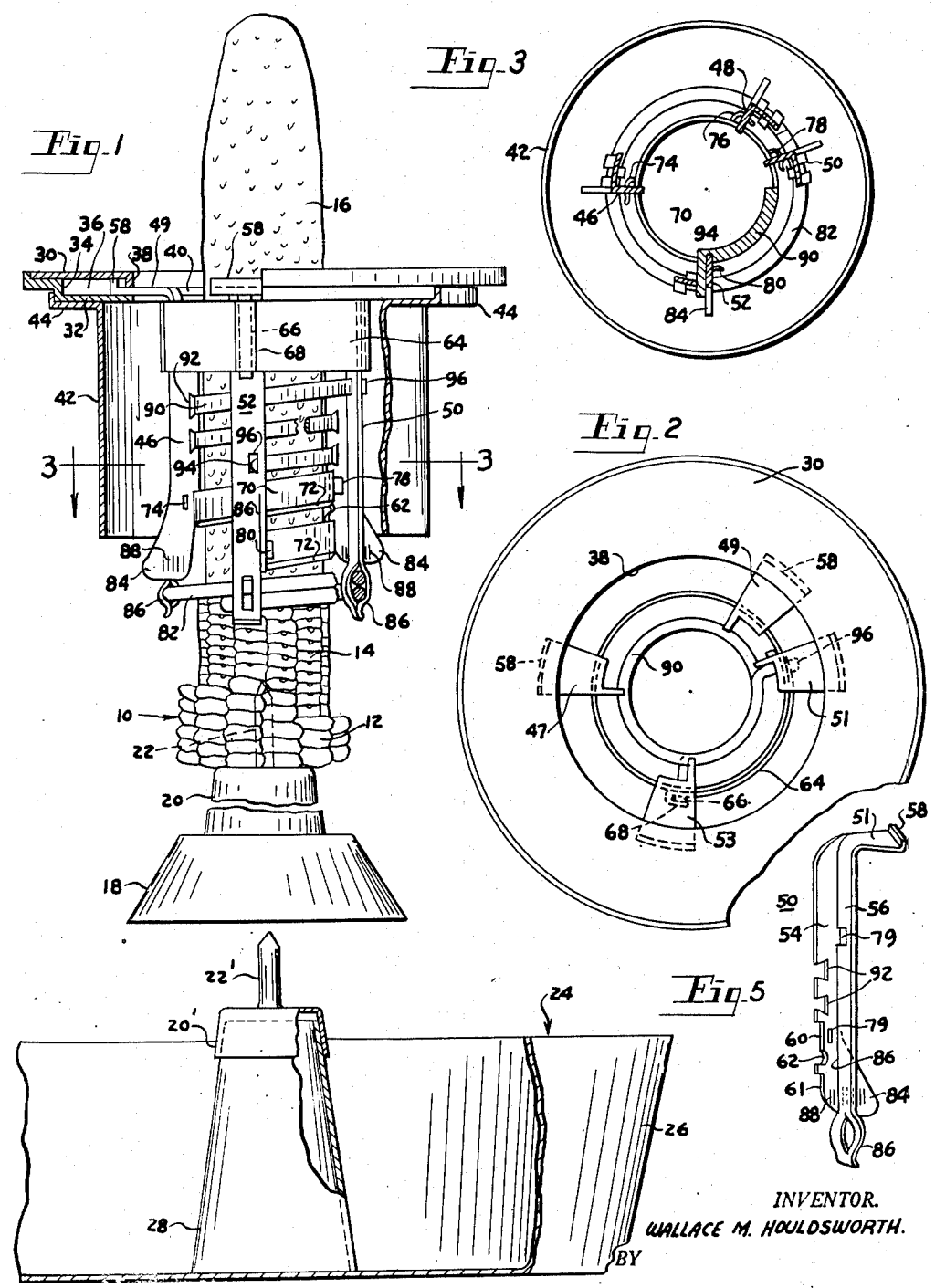

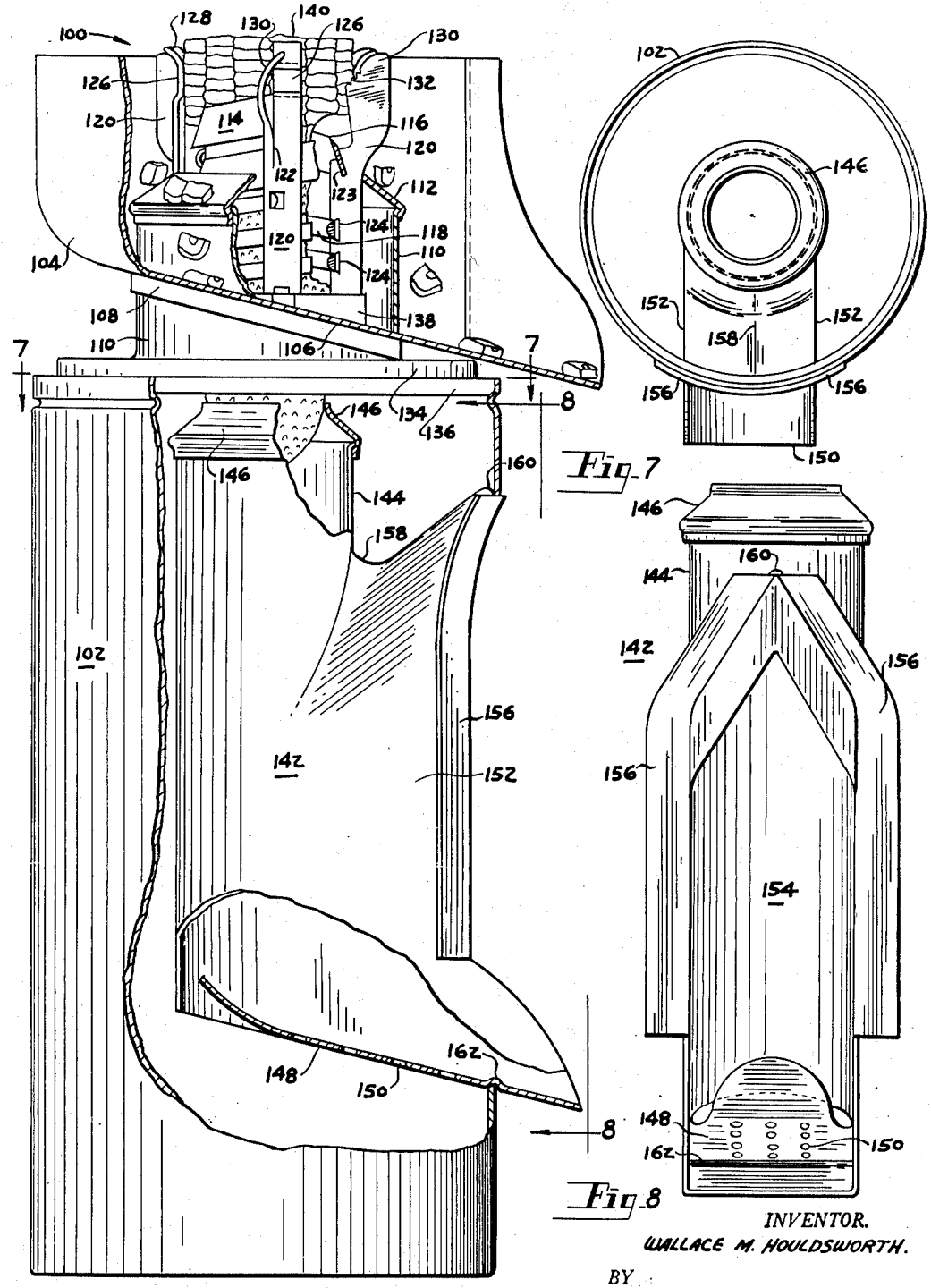

2,609,852

UNITED STATES PATENT OFFICE 2,609,852
CORN CUTTING DEVICE
Wallace M. Houldsworth, Royal Oak, Mich.
Application November 2, 1949, Serial No. 125,096
11 Claims. (Cl. 146—4)

This invention relates to devices for cutting corn kernels from cobs and particularly to improved means for accomplishing this purpose which removes and collects not only the kernels but the savory juices as well.

An important object of this invention is to provide a corn cutting and collecting device which is particularly adapted to quickly and conveniently remove and collect the kernels from either cold or hot ears of corn and, if desired, at the same time express the juices from the cob and collect the same for use with the kernels. Another important object of the invention is to provide a corn cutter having a novel cutting implement which is self-operable to gauge the depth of the cut to completely and satisfactorily remove all the kernels in one rapid relative advancement of the ear of corn therethrough. A further important object of the invention is to provide an improved device of this character, the parts of which are easily and inexpensively fabricated and assembled together and are rugged and durable in construction.

In a practical embodiment of the invention, the device is provided with a plurality of floating members extending parallel to the axis of the hole through which the ears of corn are fed and in circularly spaced relationship therearound. These members carry a novel shaped cutting implement for removing the kernels which is preferably spiral in formation. Associated with the members and connecting them together for unitary action are one or more novel spring elements which contractually urge the members and the cutting implement into engagement with the kernels on the corn. Preferably also carried by the members are gauging members which engage the ear of corn as it is cut and determine the depth of the cut to the extent that substantially complete relative solid kernels are removed from the ear. Incorporated in the device and preferably carried by the members in trailing relation to the cutting edge of the kernel severing implement, is a novel means for squeezing the cob and for expressing as much of the savory juices of the ear as possible therefrom. Associated with the device are novel collecting means for receiving the cut kernels and the juices and, in one form of the invention, also for receiving and dispensing the stripped cobs.

An important feature of the invention is the provision of spiral shaped contractible and expansible members that are successively spaced and extends more than one turn around an ear of corn and thereby provides a culinary implement of inclined cutting edges for quickly and efficiently stripping the kernels from the cob. Another important feature of the invention is the provision for automatically expanding and contracting the cutting implement as an ear of corn moves relatively through the device to thereby control the depth of the cutting implement to the desired amount without cutting into the cob and regardless of the size of the ear. This last provision gauges the depth of the cut from the circumference of the ear and serves to guide the ear in its advancement relative to the cutting implement. A further feature of the invention is the provision of a squeezing implement which is likewise preferably in the formation of a spiral and which contractually engages the cut portion of the cob rearwardly of the cutting implement to massage the unsevered portions of the kernel roots to express the juice from the cob. The two implements function conjointly so that in one operation both the kernels and the juices are removed from an ear of corn in a thoroughly efficient manner.

Other objects and advantages of the invention will be apparent to those skilled in the art to which this invention relates and from a consideration of the following detailed description in connection with the accompanying drawings wherein:

Fig. 1 is a side elevation, partly in section, of one embodiment of the invention illustrating an ear of corn supported uprightly by a holder and in the process of having the kernels removed therefrom, but for the purpose of clarity the device has been retracted slightly from its furtherest advanced position, Fig. 2 is a top plan view of the device without an ear of corn therein, Fig. 3 is a cross sectional view of the device taken along line 3—3 of Fig. 1 but without the presence of an ear of corn in the device, Fig. 4 is a side elevation, partly in section, showing how a conventional cake baking pan may be utilized to support the holder for the ear of corn and to collect the kernels and juices removed therefrom, Fig. 5 is a perspective view of one of the connecting operating arms of the device, Fig. 6 is a side elevation, partly in section, illustrating a modification of the invention wherein the device is inverted to that shown in Fig. 1 and is supported upon a collecting receptacle, Fig. 7 is a top plane view of the supporting receptacle taken along line 7—7 of Fig. 6, and Fig. 8 is a front elevation of a removable cob chute employed in the supporting receptacle of Fig. 6 and taken along line 8—8 thereof.

Two primary embodiments of the invention are illustrated herein, that shown in Figs. 1 to 5 mounting the ear of corn in stationary upright position while the device moves downwardly relative thereto, and that shown in Figs. 6 to 8 mounting the device in stationary position while the ear of corn moves downwardly therethrough. In these two embodiments of the invention the devices are in inverted relation to one another as will be understood from the following description.

Referring to the first illustrated form of the invention and particularly to Fig. 1, there is shown an ear of corn generally indicated at 10 in the process of being cut. Uncut kernels on the ear are shown at 12 adjacent to the bottom end thereof. A cut but unsqueezed section of the ear is shown at 14 immediately adjacent to the unsevered kernels 12. The cut and squeezed balance of the cob is shown at 16. In Fig. 1 the cutting operation has proceeded as far as the uncut kernels 12, but for the purpose of clarity the device has been retracted upwardly relative to the corn to expose the section 14 to view.

The ear of corn 10 is supported in upright position by an interiorly hollowed holder having a downwardly and outwardly flared base portion 18 of funnel shape to which is joined an upwardly slightly conical sleeve 20 of reduced diameter. The upper end of the sleeve is closed and projecting upwardly therefrom is a sharpened pin 22. The large end of the ear of corn 10 is forced over the pin as shown in Fig. 1 and supported thereby in upright position. The flared base 18 of the support may be positioned on the bottom of a relatively large pan or it may be received over a conical shaped tubular part forming the center of a conventional cake pan for making cakes with hollow centers. A pan of the latter type is generally indicated at 24 in Fig. 4 and includes the encircling outwardly inclined side wall 26 and the centrally disposed inverted funnel-shaped tube 28. For support thereon, the conical sleeve portion 20 is shaped to telescopingly fit the central tubular part 28 of the pan. As shown in Fig. 4, the support for the ear of corn may be modified for mounting on such a cake pan by fore-shortening the conical sleeve portion to that indicated at 20' and shaping the interior thereof for sliding fit on the upper extremity of the central part 28 of the cake pan. The pin of the modification upon which the ear of corn is spiked is indicated at 22'.

The stripping and squeezing device comprises a pair of superimposed annular shaped plate members 30 and 32 which are so shaped that in assembled position they provide a slight clearance therebetween in which operating parts of the device are received for mounting support. For this purpose the lower plate 32 has its outer marginal portion jogged as at 34 and shaped to form a seat for the upper plate 30 as shown in Fig. 1. This provides an annular shaped clearance or recess 36 between the two plate members which opens inwardly and circularly around the axis of the device. A downwardly extending lip 38 on the inner margin of the upper plate 30 partially closes the groove and forms a narrow slot 40 around the central aperture of the two plates. The major portion of the device may be enclosed within a splash guard in the form of a circular wall 42. The upper end of the wall 42 is outwardly flanged as at 44 for securement to the underside of the lower plate 32. The assembly of the plates 30 and 32 and the splash guard 42 may be secured together by welding, silver solder, or otherwise such as screws or rivets which may provide means to disassemble for cleaning, in the arrangement shown in Fig. 1.

The circular recess 36 and its narrow slot-like opening 40 formed by the superimposed plates 30 and 32 serves to hold the upper ends of a plurality of vertically extending arms which in the illustrated amendment of the invention herein are four in number. The arms are spaced circularly around the axis of the device and, as shown in Figs. 3 and 5, are generally of an L-shaped cross section for the major portion of their lengths. The four arms are indicated at 46, 48, 50 and 52. The upper end of each arm is bent outwardly radially of the device and is widened horizontally to form a lateral projecting flange or tongue which enters the slot 40 and is retained therein. Referring to Fig. 2, the tongues for the arms 46, 48, 50 and 52 are shown respectively at 47, 49, 51 and 53.

The four arms 46, 48, 50 and 52 are generally alike in construction and only vary slightly from one another in the design and location of certain connections for other operating elements of the device. For the purpose of clarity, one of the arms, namely, that indicated by the reference numeral 50, is shown in perspective in Fig. 5. The remaining three arms are similarly constructed except as described hereinafter. As previously mentioned, each arm is L-shaped in cross section as shown in Fig. 3 for the major part of its length. One portion of the L-shaped configuration of each arm extends radially of the center of the device and is indicated at 54 in the illustration of the arm in Fig. 5. The other portion of the arm is indicated at 56 in Fig. 5 and extends substantially perpendicular to the first portion and generally circumferentially of the device. The outwardly projecting tongue on the upper end of each arm is formed by making the circumferential portion longer and bending it outwardly as shown in Fig. 5. The outer extremity of each tongue is upwardly turned, as shown at 58 in Fig. 5, to form a lip and in assembled position the lip abuttingly engages the underside of the plate 30 as shown in Fig. 1. The downturned lip 38 of the plate 30 cooperates with the upturned lips 58 of the arms to hold the arms in substantially vertical suspended position. However, the recess 36 in which the tongues and lips 58 of the arms are received permits the arms to bodily move radially outwardly and inwardly of the center line of the device.

Each arm is provided with one or two recesses on the inside edge of the vertical radial portion 54 thereof in each of which a convolution of a helical stripping blade hereinafter described is received. The arm 50 depicted in Fig. 5 is provided with two such recesses 60 and 61, the upper recess of which is partly indented as at 62 to provide clearance for the cutting edge of the blade.

The arms 46, 48, 50 and 52 are yieldingly urged radially inwardly of the device, but are capable of being resistingly moved outwardly from the center thereof. For this purpose, the upper ends of the arms are encircled as shown in Figs. 1 and 2 by a flexible metallic band 64 which by virtue of its springiness tends to draw the arms radially inwardly toward the center. The opposite end sections of the band 64 overlap one another for approximately 120° as shown in Fig. 2. The intermediate portion of the spring band 64 is secured by welding, silver-solder, or the like, to the outside of the arms 46 and 48 to hold them at approximately 120° from each other and each of the arms approximately 120° from the adjacent free end of the spring band but must allow the desired expansion and contraction movement. The free ends of the bands are fastened one to each of the remaining arms 50 and 52. In the drawing, the inside end of the spring band is fastened by welding or otherwise to the circumferential portion of the arm 50 and the outside end of the band is fastened to the arm 52 by passing the end of the band through an off-set rib 66 struck out from the circumferential portion of the arm and thence bending the end of the band backward upon itself, as indicated at 68 in Figs. 1 and 2. The inherent resiliency of the spring bands tends to contractually draw the arms toward the center of the device and it is apparent that the band will yieldingly resist any expansion caused by the movement of the arms radially outwardly. The arms 46 and 48 are fixed to the band, as previously explained, and the angular distance therebetween is not varied by the expansion or contraction of the band. The two remaining arms 50 and 52, however, are secured to the free ends of the bands and when the latter is expanded they will move with the ends of the band outwardly from the center and toward one another.

Secured to the lower ends of the arms and extending in circular formation from one arm to the other arm is a cutting implement or blade for stripping the kernels from the ear of corn. The blade is indicated at 70 and, as shown in Fig. 1, is preferably of a helical or spiral formation having its opposite ends overlapping upon one another. The cutting edge of the blade is indicated at 72 and is directed downwardly, as shown in Fig. 1. The spiral blade is secured to the arms in a manner similar to the spring band 64. By means of clips 74 and 76 shown in Fig. 3, the spiral blade is secured respectively to the arms 46 and 48. These clips may be portions struck out of the spiral blade between the upper and lower edges thereof and bent backwardly for passage through a narrow slot formed in the radial portion of the arm with which it is associated. One extremity of the spiral blade is secured to the arm 50 by a backwardly bent clip 78 similar to the clips previously described. The narrow slot through which this clip extends is shown at 79 in Fig. 5 and typifies such slots in the other arms. In like manner, the opposite end of the spiral blade is secured by a clip 80 to the arm 52.

The arms 46, 48, 50 and 52 are provided with one or two recesses 60 and 61 on the inside margin of their respective radial portions as exhibited by the arm 50 in Fig. 5. The blade loosely lies in these recesses of the arms. However, in the act of severing the kernels, the blunt edge of the blade abuts the sides of the recesses and is held thereby from axial movement relative to the arms. The spiral blade 70 is inherently resilient and tends to maintain a normal contracted position for severing kernels from the ear of corn, but is capable of being expanded to increase the diameter of its coils for larger ears of corn. The connection of the blade to the arms enables the blade to move therewith radially outwardly or inwardly of the center of the device to accommodate the blade to ears of corn of different diameters.

To gauge the depth of the cut of the spiral blade 70 there is provided means on the lower end of the arms which rides over the kernels in advance of the blade and automatically causes the convolutions of the blade to be expanded or contracted in accordance with the diameter of the ear of corn. This means comprises in the embodiment of the invention illustrated in Figs. 1 to 5 a generally circular spring member 82 connected to the lower end of the arms and in encircling relationship to the ear of corn being stripped. The spring member is preferably formed of spring wire of cylindrical cross section and is arranged so that its opposite ends overlap upon one another for a part of the distance around the axial center of the device. The ends of the spring wire are free and as a result the wire is capable of radial expansion and contraction and by virtue of its inherent resiliency tends to maintain a contracted position sufficient to engage the kernels of the smallest diameter of ears of corn. The wire member is capable of being initially radially expanded by the operator and held at an expanded condition corresponding to the average minimum diameter of the ears of corn upon which the device operates.

One form of mounting for the guaging wire member 82 is illustrated in Figs. 1 to 5. As previously mentioned, the arms 46, 48, 50 and 52 are of L-shaped cross section for the major part of their lengths forming a radial portion 54 and a circumferential portion 56 as indicated in Fig. 5. The lower extremity of the radial portion of each arm is widened, as shown at 84 in Figs. 1, 3, and 5, and is split from the circumferential portion of the arm as indicated by the line 86 in Fig. 1. The circumferential portion of each arm extends below the radial portion, as shown in Figs. 1 and 5, and by virtue of the split line 86 between these two portions, the lower end section of the circumferential portion may be bent manually outwardly or inwardly relative to the radial portion. The lower end of each circumferential portion is indicated at 86 and is shaped to receive and retain the spiral spring wire member 82. For this purpose, the lower extremity of each circumferential portion is shaped to embrace the opposite sides of the wire member in the manner shown in Fig. 1. For the arms 46 and 48, the lower extremities of their respective circumferential portions are shaped to receive a single section of the wire member. The lower extremities of the circumferential portions of the two remaining arms 50 and 52 are shaped, as shown in Fig. 1, to receive the intermediate portions of the wire member and the overlapping end portion thereof in superimposed relationship, as shown in Fig. 1. Thus mounted, the wire member will permit the circumferential portions of each arm to be bent outwardly against its resistance.

To adjustably hold the gauging member 82 and the cutter blade 70 at the desired minimum diameter, the widened radial portion 84 of each arm is provided with a series of vertical corrugations 88 forming alternate parallel ridges and valleys. The adjacent edge of the circumferential portion of each arm is capable of being received in any one of the valleys or depressions of the corrugations and be held in the desired position. Thus, the operator may initially set the gauging member 82 at the average minimum diameter of the ears of corn to be stripped and by pulling out the circumferential portions of each arm the operator can select the internal diameter of the wire member 82 for riding engagement on the kernels. The alternate ridges formed by the corrugations 88 will hold the circumferential portions of the arms at the desired initial operating position until another adjustment is made by the operator. Such adjustment will automatically expand or contract the helical blade 70 to the desired diameter for stripping the kernels from the ear of corn.

Associated with the device and carried in trailing relationship to the kernel stripping blade 70 is a squeezing member for squeezing the corn cob to extract the juice therefrom. As shown in Fig. 1 and in part in Fig. 2, is a helical spring member 90 which is carried by the arms in encircling relationship to the ear of corn. The squeezing spring member 90 is held loosely by the arms so that it may be radially expanded and contracted as it slides over the stripped sections of the cob. For this purpose, each arm 46, 48, 50 and 52 is provided in the radial portion thereof with two or more dove-tailed slots 92 through which helical sections of the wire member pass.

The dove-tail slots open out through the inner margin of the radial portion 54 of each arm in the manner shown in Fig. 5. The side opening of each slot is less in width than the diameter of the squeezing member 90 so that in assembled relationship the inner peripheral portions of the member project inwardly beyond the side openings of the slots and into engagement with the stripped sections of the corn cob. The squeezing member 90 may be cylindrical in cross section or, as shown in Fig. 1, it may have a flat exterior surface and a rounded inner surface. The separate turns of the helical squeezing member 90 are passed through the slots 92 and as shown in Fig. 1 have an inner diameter less than the gauging wire member 82 in order to compressively engage the stripped section 16 of the corn cob.

The extremities of the squeezing wire member 90 project radially from the center of the device. The lower end 94 projects radially outwardly for passage through a rectangular opening 96 in the circumferential portion of the arm 52, as shown in Figs. 1 and 2. The opposite upper end 98 of the squeezing member is similarly formed and extends radially outwardly for projection through the opening 79 of the circumferential portion of the arm 50 in a similar manner. Thus loosely mounted on the arms, the squeezing member 90 is capable of radial expansion and contraction to accommodate its inner diameter of the stripped section of the corn cob upon which the device is operating and in doing so exerts a squeezing, massaging action thereon to extract the juice therefrom.

The operation of the device illustrated in Figs. 1 to 5 is evident from the previous description. An ear of corn mounted in upright position on the prong or pin 22 is held stationary. The device is grasped by the hands of the operator, such as around the rim of the plate members 30 and 32, and forced downwardly over the ear of corn. The gauging member 82 is initially adjusted to the desired diameter to slide without undue compression upon the external surfaces of the corn kernels and its adjustment determines the depth at which the spiral cutting blade 70 cuts the kernels. Carried in trailing relationship to the spiral blade is the squeezing and massaging member 90 which compressively engages the stripped section 16 of the corn cob and extracts the juice therefrom. In whatever position the gauging member 82 is adjusted, the spring band 64 acts to urge the upper ends of the arms radially inwardly to compressively urge the massaging member 90 and the cutting blade 70 against the ear of corn. As the device moves downwardly relative to the ear of corn, the gauging ring 82 rides over the kernels in advance of the cutting blade 70 and operates through the arms 46, 48, 50 and 52 to control the expansion and contraction of the blade in accordance with the diameter of the ear of corn. The kernels stripped from the ear of corn and the juice extracted therefrom flow downwardly into the pan or other receptacle upon which the base support is mounted.

In the modification of the invention illustrated in Figs. 6, 7 and 8 the device operates in inverted relationship to that previously described and is held stationary while the ears of corn are successively fed therethrough. The parts of the modified device are generally similar to those previously described but are slightly altered for the purposes described hereinafter.

In the modification, the stripping and squeezing device is generally indicated at 100 at the upper end of Fig. 6 and is mounted upon an upright tubular support or receptacle generally indicated at 102. The operating parts of the device are partially enclosed in a casing 104 which is open at its upper end and is provided with an inclined bottom 106 which receives the stripped kernels and guides them out one side of the casing. The inclined bottom 106 is provided with a large central hole through which the ears of corn pass. Surrounding the hole and forming part of the bottom 106 is a depending flange or collar 108 which is supported upon a circular splash guard 110 similar to the guard 42 previously described. The upper end of the splash guard 110 is provided with a conical shaped inwardly extending collar 112 of flexible material, such as rubber, upon which the stripped kernels fall as they are cut from the ear of corn.

The operating parts of the device are generally similar to those described in Figs. 1 to 5 inclusive. A helical shaped blade member 114 similar to the blade 70 previously described is provided. However, the separate convolutions of the blade 114 are inclined inwardly to the axis thereof. The upper edge of the blade is provided with a cutting edge 116 which is adapted to engage the kernels and sever them from the ear of corn. Operating in trailing relationship to the cutting blade is a squeezing implement in the form of a helical spring wire 118, similar in construction and operation to the squeezing member 90 previously described. As shown in Fig. 6, the squeezing member 118 is preferably rounded on its inner surface and provided with a flat external surface.

Extending in parallel relationship to the axis of the cutting member 114 and the squeezing member 118 and circularly spaced therearound are a plurality of operating arms or fingers 120 of similar construction to one another. These operating arms perform the same function as arms 46, 48, 50 and 52 previously described. The arms carry both the cutting member 114 and the squeezing member 118 and automatically expand and contract the same in accordance with the diameter of the ear of corn passing therethrough. The arms 120 are each L-shaped in cross section and include a radially projecting portion and a circumferentially extending portion which are integrally connected together adjacent to the lower ends of the arms but are separated from one another at the upper ends of the arms by slit 122.

The blade member 114 is supported in slots formed in the radially extending portion of each arm in the manner indicated at 122. The slots are inclined radially inwardly as shown and support the blade so that its cutting edge 116 is directed both upwardly and inwardly of the axis of the device. In this manner the cutting blade is supported at an angle to the circumference of the ear of corn as the latter passes therethrough. The squeezing member is supported by the arms in the manner shown similar to that described in connection with the device of Figs. 1 to 5. Each arm is provided in the radial portion thereof with two or more inwardly opening recesses or slots 124 of dove-tail formation similar to the slots 92 previously described. The opening of each slot 124 through the inner edge of the radial portion is less than the external diameter of the squeezing member and as a result the latter projects inwardly beyond the slots for engagement with the stripped section of the corn cob. The depth of the slots 124 is greater than the diameter of the squeezing member 118 and the latter is capable of slight radial expansion relative to the arms to accommodate itself to varying thicknesses of the cob without affecting the position and operation of the arms.

In the modification illustrated in Figs. 6 to 8, the encircling gauging member 62 of the previous embodiment of the invention is omitted. The arms themselves serve to engage the kernels in advance of the blade 114 and to control the radial expansion and contraction thereof. As shown in Fig. 6, the upper end of the circumferential portion of each arm is shaped to form a flat bearing surface or shoe 126 for contact with the external surfaces of the kernels in advance of the cutting edge 116. The extreme upper end of each bearing surface 126 may be outwardly bent as at 128 to facilitate sliding movement of the kernels thereunder. The radial portion of each arm is split from the circumferential portion along the line 122 as previously mentioned and the radial portion is bent as at 130 to form a finger which overlies the outside surface of the circumferential portion and acts to hold the latter at the desired minimum radial distance from the axis of the device. To initially adjust the kernel engaging shoes 126 of the arms, the overlapping radial portion 130 of each arm is provided with a series of notches or teeth 132 on their inner edge, each notch of which is capable of receiving the adjacent edge of the shoe portion 126 of the arm with which it is associated and releasably lock the same in radially adjusted position. This makes it possible to adjust the depth of the cut on different length kernels. The teeth 132 perform an operation similar to corrugations 88 previously described and enable the operator to initially adjust the radial position of the gauging shoes of the arms and to maintain the shoes in the desired radial position relative to the bent locking fingers 130.

The lower ends of the arms 120 are constructed similar to the upper ends of the arms 46, 48, 50 and 52, and are provided with tongues similar to the tongues 47, 49, 50 and 51 which are received between two superimposed plate members 134 and 136. These plate members are constructed similar to plates 30 and 32 of the previously described embodiment of the invention and permit the portions of the arms received therebetween to move radially inwardly and outwardly while holding them in substantially vertical position.

An encircling spring band 138, similar to the spring member 64 previously described, surrounds the arms and serves to draw the same radially inwardly toward the axis of the device and to yieldingly resist any outward movement thereof. The spring band is connected to the arms in the same manner as the contracting spring member 64.

The operation of the parts of the device illustrated in Fig. 6 is generally similar to that of the previously described embodiment of the invention. An ear of corn, such as that indicated at 140, is forced downwardly through the coils of the cutting blade 114. The upper ends 126 of the arms act in advance of the cutting blade and bear upon the kernels with light pressure. As the diameter of each ear varies, the arms 120 move inwardly and outwardly and this movement is transmitted to the cutting blade 114 and the squeezing member 118 to proportionately vary their respective diameters. The kernels stripped from the ear drop on the flexible collar 112 and thence upon the inclined bottom 106 of the surrounding casing. The juice extracted by the squeezing member flows downwardly along with the stripped cob sections of the ear and enters the upper end of the receptacle.

The container 102 serves as a receptacle for receiving and removing the stripped cobs and separating the juice from the cobs for any use that the operator may have therefor. The upper end of the container 102 is shaped in any suitable manner for receiving the plates 134 and 136 to support the operating parts of the device in the position shown in Fig. 6.

The vertical dimension of the container or receptacle 102 is such that it is capable of receiving the full length of a corn cob and dispensing the same therefrom. For this purpose, the receptacle 102 is provided with a removable cob dispensing chute generally indicated at 142 which is insertable into the receptacle through a side opening therein. The upper end 144 of the chute is shaped in the form of a sleeve to receive the cobs as they are discharged from the device thereabove. To complete the separation of the juice from the cob, the cob entrance of the sleeve 144 is provided with a flexible collar 146 which bears upon the cob in the manner shown in Fig. 6 and drains the juice outwardly away therefrom. The removable cob receiving chute 142 is provided with a slanting bottom 148 having a plurality of apertures 150 therein through which any juice not separated by the collar 146 may pass to the bottom of the receptacle 102.

The chute 142 as a separate unit is shown in Fig. 8 and is provided on its front side with a pair of laterally extending side walls 152—152 which form the discharge duct through which the cobs are successively ejected. These walls project through the side opening of the receptacle 102 and together form the outlet 154 as shown in Figs. 7 and 8 through which the cobs are dispensed. The outer side edges of each side wall portion 152 is flanged as at 156 and bent back with a slight curvature conforming to the radius of curvature of the receptacle 102 so as to lie flush thereagainst as shown in Fig. 7. The side walls 152—152 converge together at their upper ends and are shaped with a downwardly flaring saddle 158 down which the juices flow.

The cob dispensing chute unit 142 is entirely removable from the receptacle 102 as shown in Fig. 8. When positioned in the receptacle 102 the cob dispensing chute is provided with means for releasably locking the same therein. For this purpose, the upper converging ends of the walls 152—152 are provided with a boss 160 which engages the upper end of the opening of the receptacle into which the chute is inserted. The slanting bottom 150 of the chute is upwardly crimped as at 162 to engage the lower edge of the opening in the receptacle. Between the boss 160 and the crimp 162, the chute 142 is held at the top and bottom in proper position in the receptacle 102.

What I claim is:

1. A device for removing kernels from an ear of corn comprising, in combination, a radially expandible and contractible generally circularly shaped cutting blade adapted to encircle an ear of corn and strip the kernels therefrom, a gauging member operating in advance of said cutting blade and adapted to bear upon the external surfaces of the kernels of an ear of corn, a radially expandible and contractible generally circularly shaped squeezing member operating in trailing relation to said blade and adapted to encircle the stripped section of an ear of corn to compress the juice therefrom, a plurality of elements circularly spaced around the outside of the cutting blade and extending axially therefrom in opposite directions to said gauging member and to said squeezing member, means coupling the elements to the cutting blade and to the gauging and squeezing members and effective to expand and contract the blade and the squeezing member in response to the varying diameters of the ear of corn encountered by the gauging member in advance of the cutting blade and the squeezing member.

2. In a device for removing kernels from an ear of corn, a substantially circularly shaped member adapted to encircle an ear of corn and provided with a cutting edge for stripping the kernels therefrom, radially expandible and contractible generally circularly shaped squeezing means co-axially related to said kernel stripping member and operating in trailing relationship thereto and adapted to squeeze the stripped sections of an ear of corn, and a plurality of arms circularly spaced around the outside of said stripping and squeezing members and extending from one to the other member, and means connecting the inside of each arm to the stripping member and to the squeezing member and coupling the two members together into a unitary assembly.

3. A device for stripping kernels from an ear of corn comprising, in combination, a substantially circular radially expandible and contractible blade member adapted to encircle an ear of corn and strip the kernels therefrom, a substantially circular radially expandible and contractible squeezing member coaxially related to said blade member and operating in trailing relation thereto, said squeezing member adapted to compressively engage the stripped sections of an ear of corn to compress the juice therefrom, a substantially circular radially expandible and contractible gauging member coaxially related to said blade member and adapted to contact the external surfaces of the kernels of an ear of corn in advance of said blade member, and a plurality of elements extending parallel to the common axis of said members and circularly spaced apart therearound, and means connecting said elements to said members and coupling the members together so that the radial expansion and contraction of the blade member and the squeezing member is controlled by the radial expansion and contraction of the gauging member as the latter travels over the external surfaces of the kernels of an ear of corn.

4. In a device for removing kernels from an ear of corn, a radially expandible and contractible generally circular cutting blade inscribing at least 360° of a circle and provided with a cutting edge for stripping kernels from an ear of corn moving relatively to the blade and axially therethrough, a plurality of gauging members extending parallel to the axis of the blade and connected thereto in circularly spaced relation therearound, such gauging members projecting in advance of the blade and carrying means on their forward ends for engaging the kernels of an ear of corn, and means holding the forward ends of the gauging members in contact with the kernels of an ear of corn thus moved through the cutting blade and causing the gauging members to co-operate together to radially expand or contract the blade in accordance with the diameter of the ear of corn.

5. In a device for removing kernels from an ear of corn, a radially expandible and contractible generally circularly shaped cutting blade inscribing at least 360° of a circle and provided with a cutting edge arranged to strip kernels from an ear of corn moving relative to the blade and axially therethrough, a plurality of gauging members spaced corcularly around the outside of the blade and extending parallel to the axis thereof, means on the inside of each gauging member connecting the same to the blade, said gauging members projecting in advance of the blade and provided with means for engaging the kernels of an ear of corn moving axially through the blade to radially expand the blade against the resistance to position the cutting edge of the blade at the desired diameter for severing the kernels from the ear of corn, and a resiliently contractible element encircling the gauging members and acting to hold the same against the kernels of an ear of corn thus moved axially through the blade.

6. A device for removing kernels from an ear of corn comprising, in combination, a helical shaped blade member inscribing at least 360° of a circle and having a cutting edge adapted to strip kernels from an ear of corn moved relatively to the blade member and axially therethrough, a resiliently contractible generally circularly formed gauging member co-axially related to the blade member and disposed in advance of the latter to engage the outer surface of the ear of corn operated upon by the blade member, a plurality of elements extending parallel to the common axis of said blade and gauging members and circularly spaced therearound, means connecting said elements to said blade member and to said gauging member, said gauging member acting through said elements to vary the expansion or contraction of the blade member in accordance with the diameter of an ear of corn moved relatively therethrough, and a ring-shaped resiliently contractible band contractually encircling the elements and acting therethrough to yieldingly contract the blade member to a minimum diameter.

7. In a device for stripping kernels from an ear of corn, an annularly shaped supporting member having a radially inwardly opening slot, a generally circularly shaped kernel stripping blade inscribing at least 360° of a circle having its axis coinciding with that of said member but disposed in axial offset relation thereto, said blade being formed of resilient material and capable of radial expansion and contraction to vary its diameter in accordance with the diameter of the ear of corn upon which it acts, and a plurality of arms circularly spaced around the blade and connected thereto, said arms extending axially from the blade to the interior of said member, and a part on each arm extending radially outwardly therefrom and entering the slot of said member, said part having a permitted radial movement in said slot to accommodate the radial expansion and contraction of the blade.

8. In a device for stripping kernels from an ear of corn, a substantially circular radially expandible and contractible blade member adapted to encircle an ear of corn moving relatively axially therethrough and strip the kernels therefrom, a substantially circular radially expandible and contractible squeezing member co-axially related to the blade member and operating in trailing relation thereto, said squeezing member adapted to compressively engage the stripped sections of an ear of corn from which the kernels have been removed by said blade member to express juice therefrom, an annularly shaped supporting member co-axially related to the blade member and disposed in advance thereof and on the side thereof opposite to the squeezing member, said supporting member having a radially inwardly opening slot, a plurality of arms disposed in circularly spaced relation about the common axis of said members and extending from the interior of the supporting member past the blade member to the squeezing member, means coupling the arms to the blade member and to the squeezing member, and a part on each arm entering the slot of the supporting member and having a permitted radial movement therein to accommodate the radial expansion and contraction of the blade member and the squeezing member.

9. In a device for stripping kernels from an ear of corn, a supporting member having a circular hole therethrough and provided with a recess in the peripheral wall portion surrounding the hole and opening thereinto, a plurality of arms circularly spaced about the axis of the hole and extending substantially parallel thereto, one similar end of each arm lying within the hole and provided with an outward extension loosely entering the recess of the member for connection thereto, a helical shaped blade member inscribing at least 360° of a circle and having a cutting edge adapted to strip kernels from an ear of corn moving relatively to the blade member and axially therethrough, said blade member carried by said arms in co-axial relation to said supporting member and spaced therefrom and adapted in operation to contract and expand in accordance with the diameter of the ear of corn passing therethrough, said arms moving radially with respect to the axis of the blade member as the latter contracts and expands and being permitted such movement by virtue of the loose connection with the supporting member.

10. In a device for removing kernels from an ear of corn, a radially expandible and contractible generally circularly shaped cutting blade inscribing at least 360° of a circle and provided with a cutting edge arranged to strip kernels from an ear of corn moving relative to the blade and axially therethrough, a radially expandible and contractible generally circularly shaped squeezing means co-axially related to said kernel cutting blade and operating in trailing relationship thereto and adapted to squeeze the stripped section of an ear of corn, a plurality of gauging members spaced circularly around the outside of the blade and squeezing means and extending parallel to the axis thereof, means on the inside of each gauging member connecting the same to said blade and squeezing means, said gauging members projecting in advance of the blade and provided with means for engaging the kernels of an ear of corn moving axially through the blade to radially expand the blade against the resistance to position the cutting edge of the blade at the desired diameter for severing the kernels from the ear of corn, and a resiliently contractible element encircling the gauging members and acting to hold the same against the kernels of an ear of corn thus moved axially therethrough.

11. In a device for stripping kernels from an ear of corn, a supporting member having a circular hole therethrough and provided with a recess in the peripheral wall portion surrounding the hole and opening thereinto, a radially expandible and contractible generally circularly shaped cutting blade inscribing at least 360° of a circle and provided with a cutting edge arranged to strip kernels from an ear of corn moving relative to the blade and axially therethrough, a radially expandible and contractible generally circularly shaped squeezing means co-axially related to said kernel cutting blade and operating in trailing relationship thereto and adapted to squeeze the stripped section of an ear of corn, a plurality of gauging members spaced circularly around the outside of the blade and squeezing means and extending parallel to the axis thereof, and a part of each gauging member extending radially outwardly therefrom and loosely entering the recess of the supporting member for connection thereto, means on the inside of each gauging member connecting the same to said blade and squeezing means, said gauging members projecting in advance of the blade and provided with means for engaging the kernels of an ear of corn moving axially through the blade to radially expand the blade against the resistance to position the cutting edge of the blade at the desired diameter for severing the kernels from the ear of corn, and a resiliently contractible element encircling the gauging members and acting to hold the same against the kernels of an ear of corn thus moved axially therethrough, and adapted in operation to contract and expand in accordance with the diameter of the ear of corn passing therethrough, said gauging members moving radially with respect to the axis of the blade, squeezing means, and resilient element contracts and expands and being permitted such movement by virtue of the loose connection with the supporting member.

WALLACE M. HOULDSWORTH.

REFERENCES CITED

The following references are of record in the file of this patent:

UNITED STATES PATENTS

| Number | Name | Date |
| --- | --- | --- |
| 53,849 | McGill | Apr. 10, 1866 |
| 249,441 | Woods | Nov. 8, 1881 |
| 278,210 | Zehnder | May 22, 1883 |
| 1,828,648 | Douthitt | Oct. 20, 1931 |
| 2,214,285 | Schmidt | Sept. 10, 1940 |
| 2,323,092 | Kerr | June 29, 1943 |
| 2,326,873 | Meek | Aug. 17, 1943 |
| 2,455,449 | Thames | Dec. 7, 1948 |

FOREIGN PATENTS

| Number | Country | Date |
| --- | --- | --- |
| 483,705 | Great Britain | Apr. 21, 1938 |